United States Patent
Sales

(10) Patent No.: US 10,247,265 B2
(45) Date of Patent: Apr. 2, 2019

(54) SYSTEM AND METHOD FOR SELECTIVE ELECTROMECHANICAL COUPLING AND/OR UNCOUPLING OF AUTOMOTIVE ALTERNATOR

(71) Applicant: FCA Fiat Chrysler Automóveis Brasil Ltda., Betim (BR)

(72) Inventor: Luís Carlos Monteiro Sales, Belo Horizonte (BR)

(73) Assignee: FCA Fiat Chrysler Automoveis Brasil Ltda., Betim (BR)

( * ) Notice: Subject to any disclaimer, the term of this patent is extended or adjusted under 35 U.S.C. 154(b) by 84 days.

(21) Appl. No.: 15/545,430

(22) PCT Filed: Sep. 17, 2015

(86) PCT No.: PCT/BR2015/050155
§ 371 (c)(1),
(2) Date: Jul. 21, 2017

(87) PCT Pub. No.: WO2016/115611
PCT Pub. Date: Jul. 28, 2016

(65) Prior Publication Data
US 2018/0010652 A1 Jan. 11, 2018

(30) Foreign Application Priority Data
Jan. 22, 2015 (BR) .............. 102015001454

(51) Int. Cl.
*F16D 48/06* (2006.01)

(52) U.S. Cl.
CPC .... *F16D 48/064* (2013.01); *F16D 2500/1022* (2013.01); *F16D 2500/10418* (2013.01); *F16D 2500/3028* (2013.01); *F16D 2500/3161* (2013.01); *F16D 2500/5043* (2013.01); *F16D 2500/50284* (2013.01); *F16D 2500/7041* (2013.01)

(58) Field of Classification Search
CPC .......... F16D 48/064; F16D 2500/1022; F16D 2500/10418; F16D 2500/5043; F16D 2500/7041
See application file for complete search history.

(56) References Cited

U.S. PATENT DOCUMENTS

| | | | |
|---|---|---|---|
| 5,139,463 A | 8/1992 | Bytzek et al. | |
| 5,968,456 A | * 10/1999 | Parise | B01F 5/0614 422/174 |

(Continued)

FOREIGN PATENT DOCUMENTS

| | | |
|---|---|---|
| CN | 1668859 A | 9/2005 |
| DE | 19638872 A1 | 3/1998 |

(Continued)

*Primary Examiner* — Edwin A Young
(74) *Attorney, Agent, or Firm* — The Webb Law Firm

(57) ABSTRACT

It is herein described a system and a corresponding method to carry out the selective coupling and uncoupling of an alternator in relation to an engine crankshaft pulley. The alternator is kept coupled or uncoupled depending on the detected battery charge, and both coupling and uncoupling are performed in two different steps and lagged in time, one step providing the electric coupling or uncoupling, and the other step providing the mechanical coupling or uncoupling.

10 Claims, 5 Drawing Sheets

(56) References Cited

U.S. PATENT DOCUMENTS

| | | | |
|---|---|---|---|
| 6,083,130 A | 7/2000 | Mevissen et al. | |
| 6,798,094 B2 | 9/2004 | Hirsou et al. | |
| 6,870,350 B2 | 3/2005 | Garrigan et al. | |
| 7,618,337 B2 | 11/2009 | Jansen et al. | |
| 7,712,592 B2 | 5/2010 | Jansen et al. | |
| 7,816,893 B2 | 10/2010 | Oshima | |
| 2009/0176608 A1 | 7/2009 | Jansen et al. | |
| 2012/0169050 A1* | 7/2012 | Daum | B60L 11/123 290/31 |
| 2012/0318213 A1 | 12/2012 | Kobayashi et al. | |
| 2014/0138204 A1 | 5/2014 | Danford | |
| 2014/0277986 A1* | 9/2014 | Mahler | G06F 7/00 701/93 |
| 2014/0309882 A1* | 10/2014 | Antchak | F02B 67/06 701/36 |

FOREIGN PATENT DOCUMENTS

| | | |
|---|---|---|
| DE | 202013100868 U1 | 5/2013 |
| JP | 2007270884 A | 10/2007 |
| WO | 9850709 A1 | 11/1998 |

\* cited by examiner

SYSTEM AND METHOD FOR SELECTIVE ELECTROMECHANICAL COUPLING AND/OR UNCOUPLING OF AUTOMOTIVE ALTERNATOR

CROSS-REFERENCE TO RELATED APPLICATIONS

This application is the United States national phase of International Application No. PCT/BR2015/050155 filed Sep. 17, 2015, and claims priority to Brazilian Patent Application No. BR102015001454-6 filed Jan. 22, 2015, the disclosures of which are hereby incorporated in their entirety by reference.

FIELD OF THE INVENTION

The present invention relates to a system and a method to electrically and mechanically couple and/or uncouple the automotive vehicles alternator. More particularly, the present invention relates to a selective alternator coupling or uncoupling according to the vehicle battery level.

BACKGROUND OF THE INVENTION

The systems for generating vehicle electricity, as known in the art, usually comprise an electric machine that is responsible for the electrical energy production, driven by an automotive engine at the ignition moment, through a synchronizing belt. The alternator feeds all electrical devices during the vehicle operation and recharges the battery, and its name is a reference to the type of produced current. It works according to the electromagnetic induction principle: the electric current flows through the rotor creating a magnetic field which induces the movement of electrons in the stator coils, resulting in an alternating current. As cars operate with direct current, the automotive alternators include two fundamental components: the rectifier plate (rectifier), which transforms the alternating current into direct current, as well as the voltage regulator, which controls the produced voltage.

However, and despite the broad use of these electric machines in vehicles, said electric machines contribute to fuel consumption and carbon dioxide ($CO_2$) emissions, since these machines represent a mechanical energy consumer source from the crankshaft. As the engine mechanical energy is obtained from thermal energy generated from the fuel combustion, the alternator works as a load to the system, which, when the battery is in a loading situation, induces to fuel consumption increasing to compensate the energy used by the alternator. Moreover, even with an adequate battery charge level, the alternator continues to consume mechanical energy from the crankshaft due to its inertial mass which is still spinning at the same engine speed.

The fuel consumption and carbon dioxide emissions represent, in a direct form, indicators that determine the vehicle energy efficiency. The fuel burning, in particular the fossil fuel, produces high concentrations of carbon dioxide ($CO_2$) generated from combustion. The high emissions levels of carbon dioxide expelled into the atmosphere promote detrimental effects to the environment, such as the greenhouse effect and consequent global warming, resulting in natural disasters possibilities (e.g. tsunami) as well as climate changes which influence agricultural production. Furthermore, the fuel consumption is related to the carbon monoxide (CO) and hydrocarbons (HC) emissions which are proven harmful to human health.

To minimize the negative effect of the alternators on the vehicle fuel consumption, it was designed and implemented some inventiveness and improvements. Typically, projects are based on increasing the alternator efficiency (electrical and mechanical) and the possibility of an alternator strategic operation as a function of the battery electricity demand.

The invention disclosed in document US 20090176608 uses a pulley to reduce the alternator belt tension, decreasing the impact during the coupling process. Therefore, the torsion spring and the clutch spring are wound in opposite directions, thus allowing the clutch spring to expand in order to couple with the inner surface during acceleration of the pulley relative to the cushion.

The system disclosed in document U.S. Pat. No. 5,139,463 uses an alternator with serpentine belt together with a spring in order to allow instantaneous rotation in the direction of the alternator pulley, allowing the alternator to perform instantaneous rotations in opposite directions.

The system disclosed in document U.S. Pat. No. 7,712,592 uses a limiter spring course for the alternator over-uncoupling. This uncoupling assembly is used to transfer the rotational movement between the engine shaft and the belt. The limiter spring course prevents contaminants from entering to the uncoupling assembly, retaining the lubricant within the assembly.

The system disclosed in document CN 1668859 uses bare wire spring and grease lubrication in the uncoupling alternator pulley. The torsion spring and the clutch spring are wound in opposite directions, thereby allowing the clutch spring to expand into coupling, adhering itself to the inner surface during the pulley acceleration relative to the cushion and uncoupling during the slowdown relative to the cushion pulley.

The system disclosed in document U.S. Pat. No. 6,870,350 uses a controller to measure voltage in the secondary winding. It is used for controlling magnetic field of synchronous machines and can withstand to parameter variations of the operating point, being insensitive to nonlinearities and adapting to the design changes.

However, despite all the described inventions reduce the effects of the alternator mechanical load on the crankshaft, no one of them allow the complete alternator mechanical uncoupling relative to the crankshaft.

The system disclosed in document U.S. Pat. No. 6,798,094 uses a rotating electric machine, and in particular, the vehicle alternator which comprises a stator resiliently mounted on a heat conductive resin. This inventiveness produces the radial mechanical uncoupling between the stator and the coating resin, so as to dissipate thermal energy from the stator towards the resin. This system heavily depends on improvement of heat dissipation properties and the entire system vibration.

In order to minimize the effect of the alternator mechanical load on the crankshaft, the documents DE 19638872 and U.S. Pat. No. 7,816,893, related to the Bosch LIN alternators line, use the strategy of, under specific conditions, electrically uncouple the alternator relative to the vehicle electrical loads. This electrical uncoupling occurs when the battery has sufficient charge level to powering the vehicle electrical system, or when the alternator operating conditions are inappropriate, among other situations. The electric coupling is carried out when the battery reaches a minimum level of electrical charge and needs to be recharged. Hence, during the periods of the alternator electrical uncoupling, the mechanical load on the crankshaft is minimized. However, part of the mechanical load still remains due to the rotating inertial mass present in the alternator shaft. Not only the rotor spinning consumes a portion of the energy produced by the combustion engine, but also the rotor spinning, relative to the stator, leads to generate a magnetic field and to appear an electric voltage (even with the alternator electrically uncoupled), without generating a useful electric energy production, i.e. work. This situation unnecessarily increases the energy consumption produced by the combustion engine. Therefore, even with lower intensity, the crankshaft continues with the effect of a mechanical load, impacting the internal combustion engine energetic efficiency.

Objects of the Invention

It is a first object of the present invention a system to perform the alternator selective coupling and uncoupling relative to the crankshaft, so as to reduce its load and the carbon dioxide (C02) emission level, and, therefore, the fuel consumption, in addition to other greenhouse gases emissions, such as carbon monoxide (CO), hydrocarbons (HC) and nitrogen oxides (NOX).

It is another object of the present invention a system to perform the alternator selective coupling and uncoupling from not simultaneous electrical and mechanical coupling/uncoupling.

It is an additional object of the present invention a system to perform the alternator selective coupling and uncoupling in order to overcome the known art.

SUMMARY OF THE INVENTION

The above mentioned objects are achieved and carried out with an alternator uncoupling system relative to the crankshaft which allows the total mechanical load release on the crankshaft when the battery is in sufficient electrical charge conditions to maintain the vehicle electrical system working. This inventiveness enables, strategically and automatically, the reduction of fuel consumption and carbon dioxide (C02) emissions as well as the polluting gases emissions, such as carbon monoxide (CO), hydrocarbons (HC) and nitrogen oxides (NOX).

In other words, the present invention relates to an intelligent system for a selective electromechanical coupling and/or uncoupling of an automotive alternator, of the type to be applied to a vehicle equipped with an internal combustion engine, said engine having a crankshaft which protrudes beyond the engine block, and wherein a pulley is coupled for mechanical drive, in rotation, of an alternator, besides other automotive devices, said alternator comprising: a rotor and a stator, said rotor having a shaft protruding beyond the housing; an electromagnetic clutch coupled to the alternator rotor shaft and fixed relative to the alternator housing; said clutch externally supporting the pulley which is coupled, in rotation by the belt, to the crankshaft pulley; a voltage regulator which controls the alternator output voltage, said voltage regulator receiving command signals from the connector, via a data line, generated from an ECU; and a voltage output, electrically coupled to the vehicle electrical loads to the battery, in said battery being connected a sensor of the battery state-of-charge level, and wherein said sensor supply indicative signals of the battery state-of-charge to the ECU, via data line, wherein the ECU commands the coupling and/or uncoupling of the alternator based on the battery state-of-charge. More particularly, the ECU commands the alternator coupling and/or uncoupling in accordance with the comparison of the signal received from the sensor with LCi LCs values of pre-defined load, respectively. Furthermore, the ECU commands the alternator coupling and/or uncoupling, through a data line, which links an ECU output with a clutch feeding and driving input, by means of a relay.

In particular, the clutch comprises a coil electrically connected with said feeding and driving input, said coil being supported by a flange and acting to magnetically translate a disc, said disc being coupled to the end of a shaft, the opposite end of said shaft being shaped to couple the protruding end of the alternator shaft; and wherein the clutch shaft is mechanically coupled to the pulley by means of a support structure. The flange is held in position by pillars which protrude from a flange attached to the front portion of the alternator housing, and wherein the pulley is arranged at the portion internally delimited by said flanges. Preferably, the alternator coupling and/or uncoupling is performed through two successive and different actions, being the first one the mechanical coupling and/or uncoupling action and the second one the electrical coupling and/or uncoupling action.

Moreover, the present invention comprises a method for an automotive alternator selective electromechanical coupling and/or uncoupling comprising the steps of: detecting the battery state-of-charge; comparing the battery charge state-of-charge with a predetermined charge value; and perform the alternator coupling when the load is less than the predetermined load value; or performing the alternator uncoupling when the load is higher than a predetermined value. Specifically, performing the step of coupling comprises the steps of: mechanically coupling the alternator; and electrically connecting the alternator; considering that it is foreseen a delay time between the mechanical coupling step and the electrical connection step. Likewise, performing the uncoupling step comprises the steps of: electrically disconnecting the alternator; and mechanically uncoupling the alternator; considering that it is foreseen a delay time between the electric disconnection step and the mechanical uncoupling step.

BRIEF DESCRIPTION OF DRAWINGS

The present invention will be better understood from the detailed description of a preferred embodiment of the invention, which is illustrated and supported from the attached figures, which would be considered a mere illustration and orientation, but not as a limitation of the invention scope, in which.

DESCRIPTION OF A PREFERRED EMBODIMENT

Figure 1:
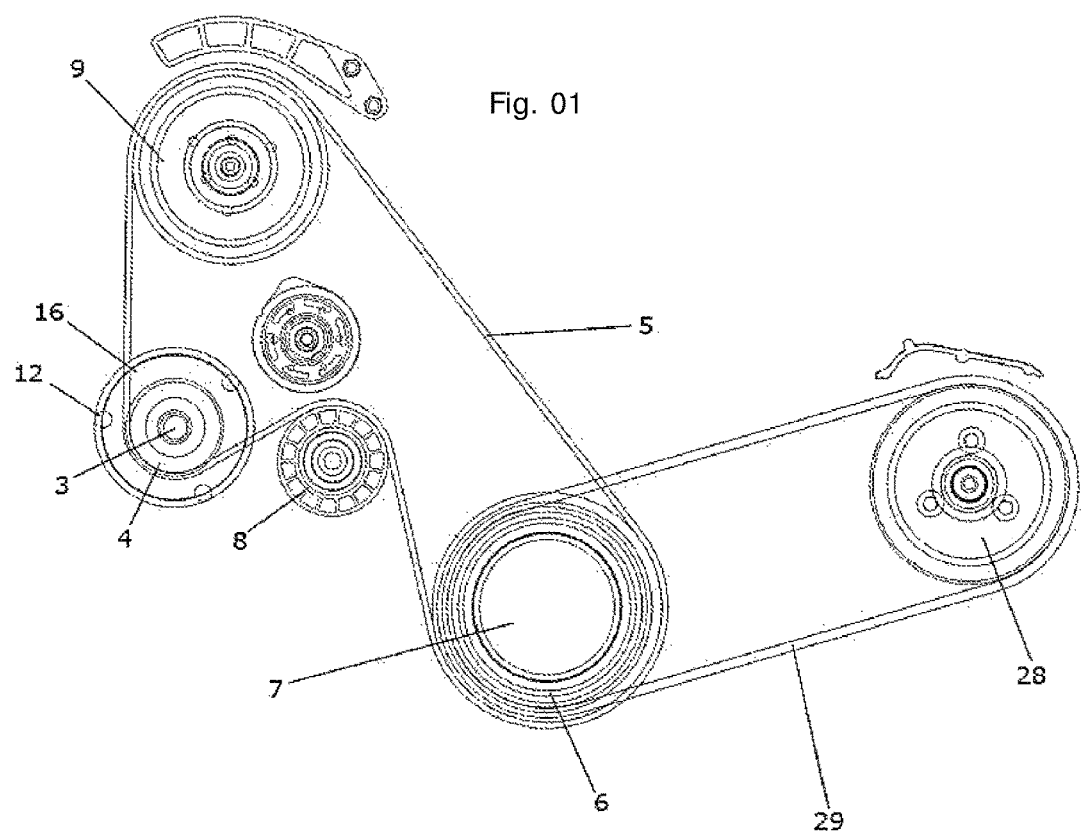
FIG. 1 is a schematic view of the mechanical coupling between the alternator pulley and the crankshaft pulley.
Figure 2:
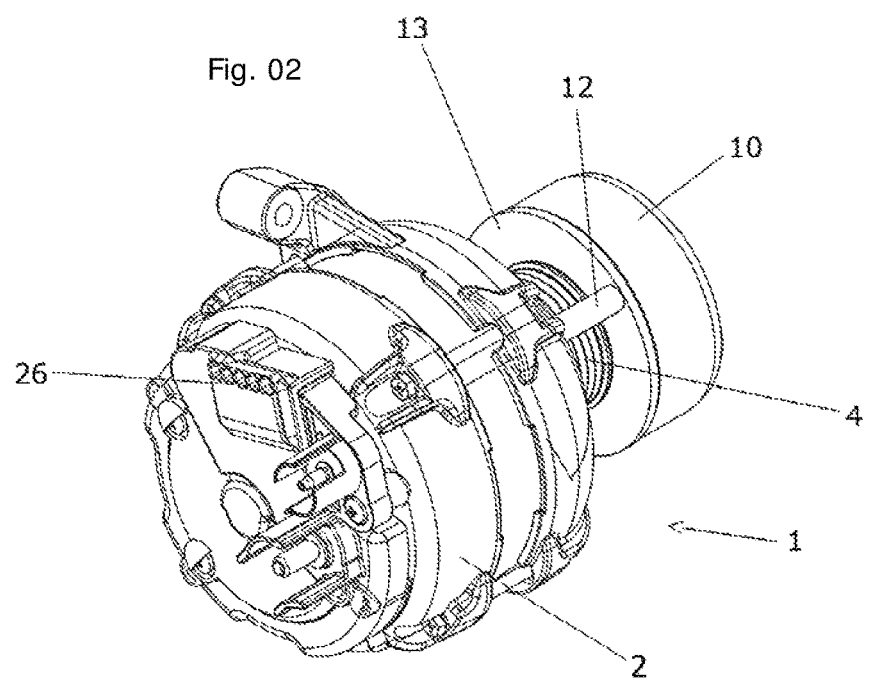
FIG. 2 is a perspective view of the alternator, provided with a clutch according to the invention.

In compliance with the attached FIGS. 1 and 2, the reference number 1 generally indicates an alternator according to the present invention, which comprises, in a known manner, a housing 2, inside of it are housed a rotor (not shown) and a stator (not shown), which relative rotational movement leads to the generation of an electromagnetic field in order to produce electric energy.

The stator is fixedly mounted relative to said housing 2 and the rotor occupies a central position of the alternator 1 and is supported, in free rotation, about an shaft 3 (see FIG.

2), said shaft protruding beyond the volume delimited by said housing 2 and it is intended to receive the required rotations in order to provide the necessary rotating movement between rotor and stator.

On the shaft 3 protruding portion is arranged a pulley 4 designed to engage a belt 5 which connects, in rotation, the alternator 1 pulley 4 with the crankshaft 7 pulley 6. Still in known manner, said belt 5 can interact with other mechanical devices, for example, a tensioner 8 designed to keep the belt 5 tensioned in specific parameters of use as well as guiding pulleys in the form of idlers (not shown). Likewise, the crankshaft 7 pulley 6 is also geared to other vehicle devices such as, for example, the power steering pump pulley 28, through the belt 29, and the air conditioner pulley 9.

Finally, the mechanical coupling between the shaft 3 and the pulley 4 is performed and intermediated by means of a clutch 10, of the type electromagnetic, and able to couple and uncouple the shaft 3 with respect to the pulley 4.

Figure 3:
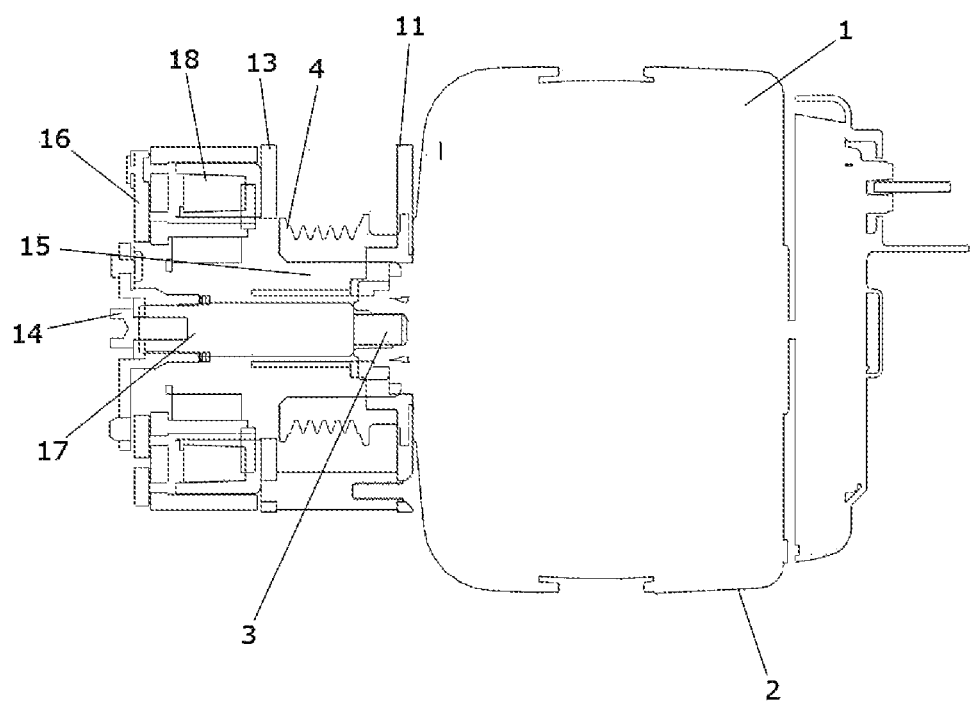
FIG. 3 is a cross-sectional view of the alternator coupled to the clutch.

More in particular, regarding to FIG. 3, in the alternator 1 front end, that is, the longitudinal end, from which protrudes the shaft 3, is fixed a flange 11 in a ring form. From said flange 11, pillars 12 protrude (see FIG. 2) and in their opposite ends a second clutch 10 support flange 13 is fixed. In the inner portion of the first 11 and second 13 flanges, it is provided the pulley 4. Thus, the bridged structure defined by flanges 11 and 13 and by the pillars 12 enables the arrangement of the pulley 4 between the clutch 10 and the alternator. However, and alternatively, the clutch 10 may be arranged between the pulley 4 and the alternator 1 without such an arrangement changes operation and the advantages resulting from the present invention.

Specifically with regard to the clutch 10, it has a mechanical shaft 17 whose axis is coincident with the alternator shaft 3 axis. Said shaft 17 is movable in the longitudinal direction and is able to couple or uncouple the alternator shaft 3 according to its relative position. More specifically, a first shaft end 17 enters or is entered by the alternator shaft 3 protruding end. Thus, when the shaft 17 is in the coupling position, said first shaft 17 end is brought into coupling contact with the corresponding alternator protruding shaft 3, so that said shafts 17 and 3 can rotate in a linked form relative to one another.

Furthermore, the shaft 17 is mechanically connected, in rotation, with the support structure 15 on which the pulley 4 is mounted. Thus, the shaft 17, the support structure 15 and the pulley 4 are mechanically connected in rotation.

Furthermore, the shaft 17 end 14, opposite to said first end, is connected in translation with the metal disk 16, which defines the rear closing of the clutch 10 and acts as a first magnetic pole. Finally, in the inner portion of the flange 13 is fixed a coil 18 designed to interact magnetically with the metal disk 16. Thus, when the coil 18 is energized, it attracts the metal disk 16, causing its movement to a position closer to the alternator 1. In this situation, the metal disk 16 moves the shaft 17 in the same direction, causing the mechanical coupling, in rotation, of the shaft first end with the protruding and shaped end of the alternator 1 shaft 3. Thus, the pulley 4 is connected, in rotation, with the alternator shaft 3, by means of shaft 17, and the support structure 15.

By the other hand, the uncoupling between the pulley 4 and the alternator shaft 3 is performed in a reverse form, i.e. from the interruption of the coil 18 energization. Thus, the metal disc 16 returns to its rest position (away from the coil 18), retracting the shaft 17, which is uncoupled from the alternator shaft 3. In this condition, the pulley 4 remains mechanically connected to the support structure 15, though no longer with the alternator 1 shaft 3, allowing the free rotation of the elements 4, 15 in a form completely independent with respect to the alternator 1.

Furthermore, it must be underlined that, despite the above description, the clutch 10 may operate according to an opposing energization, i.e. with the uncoupling being performed from the coil 18 energization. Such a construction is inherent to the clutch 10, as above described, and can be implemented by any expert in the art in a simple and direct way.

Figure 4:
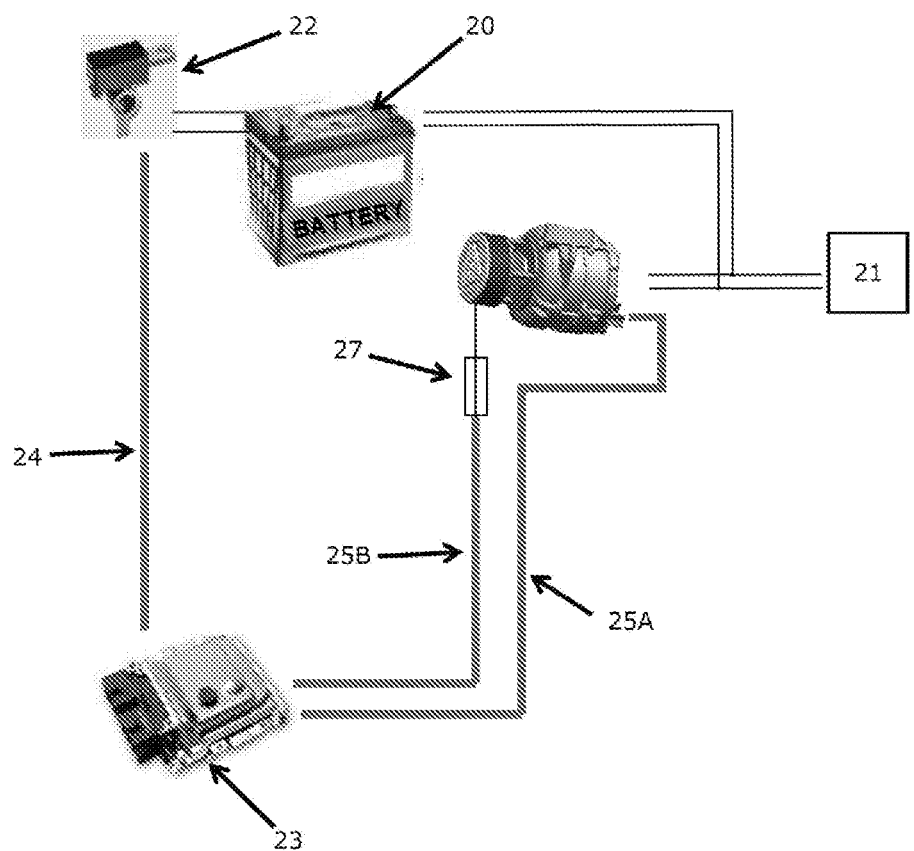
FIG. 4 is a schematic view of electrical connections of the system of the invention.

Regarding to the system electrical connections of the present invention (see FIG. 4), the alternator 1 is electrically connected in parallel with the battery 20 and both are connected in order to supply the electrical loads 21 of the vehicle such as air-conditioning, radio, internal and external lights etc.

In turn, the battery 20 is further connected to a sensor 22 of the battery state-of-charge, which is able to evaluate the electrical charge stored in the battery cells and provide an indicative load signal to the ECU or ECUs 23, through a data line 24. Alternatively, the electronic control unit can be other than an ECU such as in those vehicles equipped with a plurality of dedicated and generic electronic units.

Finally, the ECU 23 is also connected to the alternator 1 through the data line 25A, and to the clutch 10 through the data line 25B, so as to be able to control the electrical performance (coupling or uncoupling) of the alternator 1 and the mechanical performance of the pulley 4, respectively. More particularly, the alternator 1 also comprises, in addition to the electrical connection with the battery 20 and electrical loads 21 of the vehicle, a logical connection 26 (see FIG. 2) which connect the voltage regulator (not shown) of the alternator 1 with the ECU 23 through line 25A. I should be noted that, according to the vehicle communication logical infrastructure in which the system is installed, the lines 24 and/or 25A, 25B may be independent lines or may be part of a CAN network or a pre-assembled Ethernet.

Additionally, data line 25B connects the ECU 23 with the clutch 10, in particular with the coil 18 power connector (not shown) through a relay 27. It should be noted that the alternator 1 electrical connections can be arranged only on its rear portion (see FIG. 2), or said electrical connections may include an exclusive feeding and driving input, as an electric connector for powering the coil 18, directly coupled, for example, to the inner portion of the flange 13 which does not rotate in whatever pulley 4 coupling condition.

In operation, the system of the present invention initially evaluates the battery 20 charge, through the sensor 22, which reports to the ECU 23, via line 24, the percentage of charge remaining in said battery cells. If there is sufficient charge percentage, i.e. more than a predetermined LCs limit, the ECU processes this data and thus sends signals, via lines 25A and 258, to take place the pulley 4 uncoupling or the alternator 1 uncoupling with respect to the crankshaft 7.

Specifically, such uncoupling is carried out in two different steps. In a first step, the ECU 23, through the line 25A, commands the alternator 1 voltage regulator for an electric uncoupling condition in relation to the vehicle's electrical system. At this point, the alternator stops electrically powering the vehicle, what shall be carried out exclusively by the battery 20. In the second step, the ECU 23, through the line 258, commands the relay 27 (or equivalent electromechanical device), to stop powering the coil 18, and thus to cause the mechanical uncoupling between the clutch 10 shaft 17 and the alternator 1 shaft 3. At this point, the pulley 4 is uncoupled from the alternator 1, and can thus rotate freely and independently of the alternator.

Once the vehicle alternator 1 is uncoupled (electrically and mechanically), and in particular from the 12V power supply and crankshaft 7, respectively, the alternator is no longer a mechanical load to be put in rotation by said crankshaft 7, since the alternator pulley 4 rotates freely because it is not mechanically coupled, in rotation, with the rotor shaft 3. Hence, the work required to the vehicle engine is reduced, consequently also reducing fuel consumption and gas emissions from the vehicle engine. During this operation step, the vehicle electrical loads 21 are powered exclusively by the battery 20, whereby the electric charge stored in its cells will be consumed. This situation remains until the ECU detects that the sensor 22 indicates that the battery 20 has reached a second pre-defined LCI limit, lower than the first LCs limit.

At this moment, the ECU processes the information received from the sensor 22 and thus commands the coupling (mechanical and electrical) of said alternator in the other vehicle systems. In particular, according to the present invention, the alternator coupling is, sequentially, mechanical and electrical. First, takes place the mechanical coupling by driving the electromagnetic clutch 10, in order to minimize the effect of exceeding mechanical load (high torque in all), and the electrical coupling being then carried out. This strategy is important to preserve the life cycle of the related components and it does not affect the vehicle driving.

In particular, and in reverse manner to the uncoupling procedure above described, the ECU 23 sends a first signal, via line 25B, in order the relay 27 energizes again the coil 18, and thus causing the clutch 10 shaft 17 is mechanically coupled, in rotation, with the alternator rotor 1 shaft 3. In this condition, the alternator rotor rotates back in regard to the stator. Subsequently, the ECU 23 commands the alternator 1 voltage regulator, via line 25A, in order to re-establish the electrical connection of the alternator with the vehicle electrical system, particularly with the battery 20 and the loads 21.

Furthermore, it has to point out that, depending on the battery state-of-charge, the Electronic Control Unit commands the electromagnetic clutch 10 in order to perform the uncoupling of the alternator shaft in relation to the crankshaft. The battery state-of-charge, appropriated for uncoupling, depends on the battery specification and the vehicle electrical system that is connected to the alternator 1 electrical load output (21), i.e. the working conditions included in the electrical design.

Both the alternator 1 shaft 3 coupling and the uncoupling to the crankshaft 7, commanded by the Electronic Control Unit 23, take place when the battery state-of-charge, identified by the sensor 22, reaches a LCi minimum value or a LCs maximum value, as per specified in the electrical design. In particular, such LCi and LCs values also depend on the battery type used (lead, ion lithium, etc.), the battery lifetime in terms of charge/discharge cycles and any particular characteristics of the vehicle.

For example, in vehicles equipped with the system known as Start & Stop, the LCi load value cannot be pre-defined as a very low load percentage, since any excessive reduction of battery 20 charge could affect the vehicle engine starting. The so-called Start & Stop system can be defined as a system that disables the internal combustion engine in situations of vehicle parking, while maintaining electronic systems in operation. Thus, in a temporary vehicle parking, the combustion engine is temporarily switched off, thereby eliminating completely pollutant emissions and fuel consumption. When the vehicle driver shows an intention of restarting to drive, for example, through the engagement of a gear, driving one of the pedals or other action, the system automatically starts the internal combustion engine.

The coupling of the alternator 1 shaft to the crankshaft 7 shaft 6 can also strategically takes place in internal combustion engine deceleration conditions (e.g. vehicle going down a mountain with engine braking), wherein the battery can hold electric charge higher than the minimum level specified in the design. This strategy is for regenerating energy coming from the vehicle motor braking (deceleration with the motor coupled to the transmission).

This new system is different from others because it has the ability to neutralize the alternator mechanical and electrical loads on the crankshaft, while the battery has adequate levels of electrical charge in order to keep the vehicle electrical system in working conditions. Another major difference of this new system in regard to others is that there is the combination of electric and mechanical uncoupling in order to minimize excessive effort at the time of coupling, i.e. the electrical coupling only takes place after the alternator mechanical coupling to the crankshaft.

Figure 5:
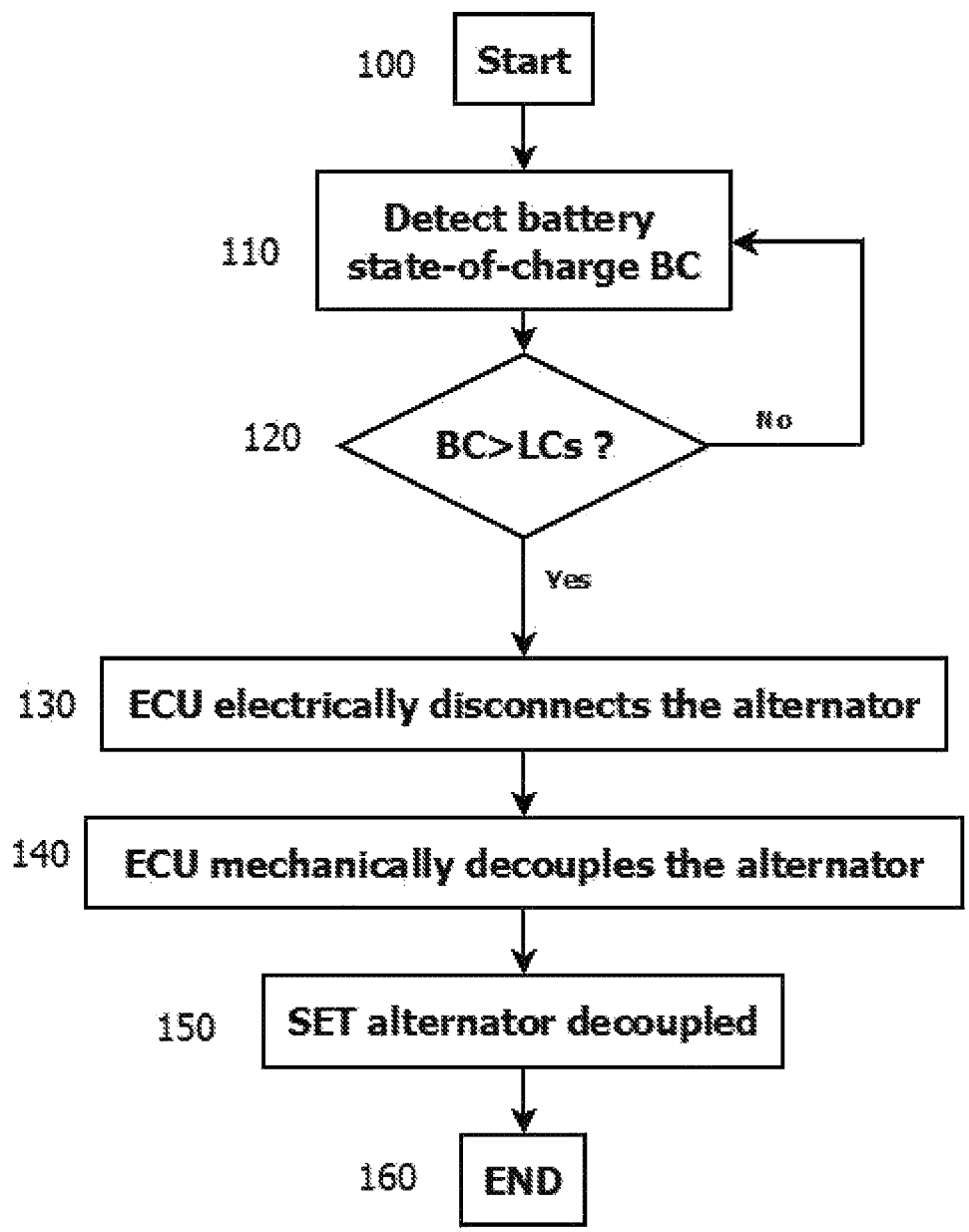
FIGS. 5A and 5B are block diagrams of the methods steps according to the present invention.
Figure 5:
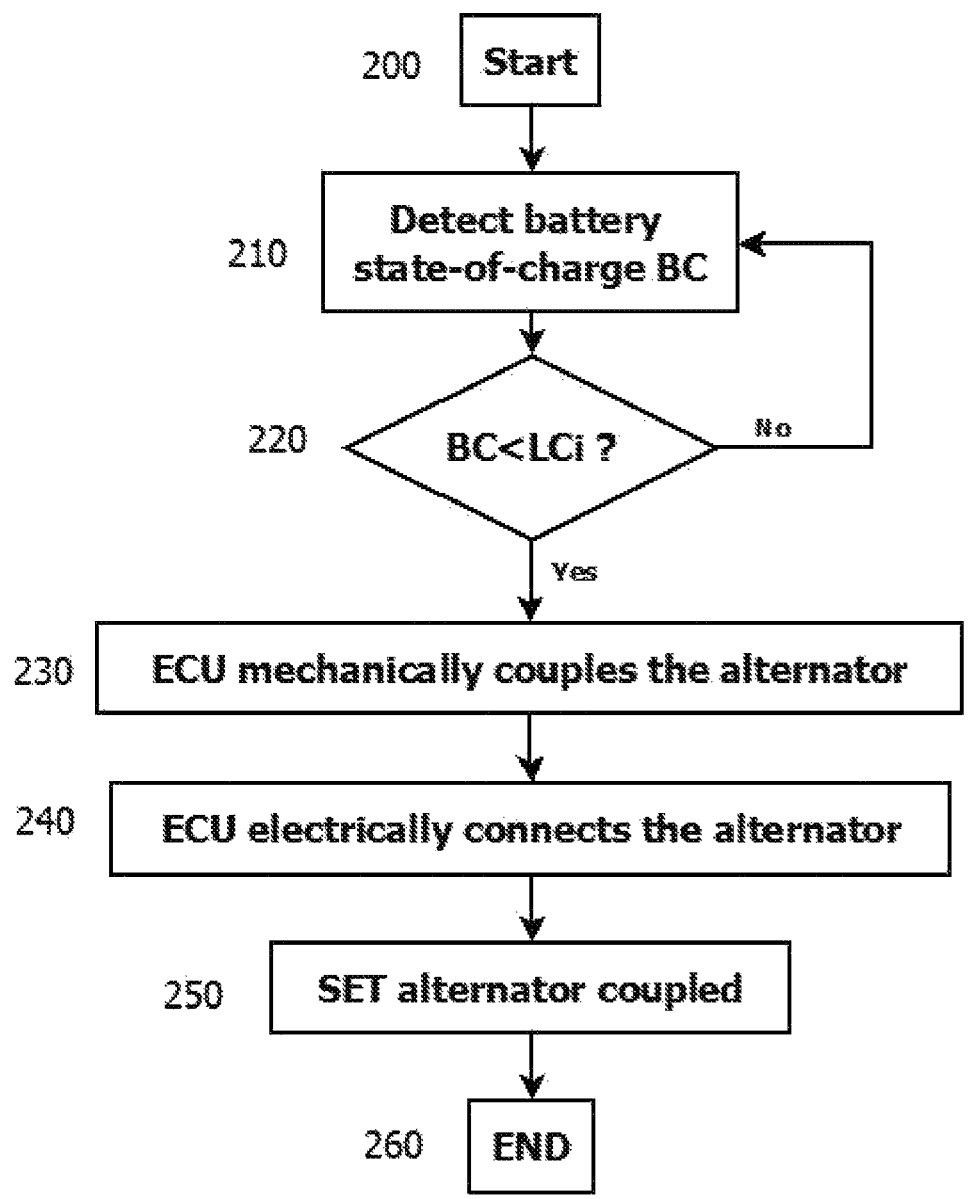

Moreover, the present invention also relates to methods for the automotive alternator electromechanical coupling and uncoupling, as schematically shown in FIGS. 5A and 5B.

Regarding specifically to the FIG. 5A related to the alternator uncoupling method, it starts obviously from a vehicle situation wherein the alternator is mechanically coupled to the crankshaft and electrically connected to the electric vehicle systems (battery, electric charges, etc.) and, thus, initially (step 110) a processor receives a BC signal (battery state-of-charge) indicating the battery charge level and then compares the level (step 120) with a LCs value (high limit battery state-of-charge) of pre-defined charge. If the battery charge BC level is less than the LCs value, the routine starts executing a test loop (while the alternator continues to charge the battery) until the processor detects that the battery charge BC value is higher than the LCs limit value. At this point (step 130), the processor indicates the alternator electric uncoupling instruction and starts counting a reference time t1. When such a reference time t1 is reached, the processor (step 140) indicates the alternator mechanical uncoupling instruction and then generates a logical set (step 150) residing internally to indicate that the alternator is in the uncoupling condition (electrically and mechanically) in relation to the vehicle.

Now, with particular reference to FIG. 5B, related to the alternator coupling (or re-recoupling) method, the routine begins (step 200) only when the alternator set indicates the uncoupled condition. As in the previous case, the processor receives a battery state-of-charge BC indicator signal and then compares (step 220) with a LCi value (low limit battery state-of-charge) of pre-defined charge, which is the minimum charge the battery should operate in the uncoupled condition as safety measure. If the battery charge BC value is higher than the LCi value, the routine starts executing a test loop (while the vehicle continues to use only battery power) until the processor detects that the battery charge BC is less than the LCi limit value. At this point (step 230), the processor indicates the alternator mechanical coupling instruction and starts counting a reference time t2. When such a reference time t2 is reached, the processor (step 240) indicates the alternator electric coupling instruction and then (step 250) generates a logical set residing internally to indicate that the alternator is in coupled condition (electrically and mechanically) in relation to the vehicle.

As described, the above mentioned coupling method foresees mainly to protect the system components, preventing extreme torques during the steps of uncoupling and mainly coupling. Therefore, during the alternator coupling, the pulley 4 mechanical coupling takes place before the alternator electrical connection with the vehicle electrical system, so that the mechanical coupling takes place only confronting the rotor rotational inertia and a small alternator rotational resistance because of the interactive field between rotor and stator. Therefore, it is foreseen a t2 delay time between a step and another. Similarly, in the uncoupling it is also foreseen a t1 delay time, being t2 longer than or equal to t1.

Finally, it is clear to an expert in the art, the LCs value is higher than the LCi value, these two values or parameters being chosen depending on the type of battery used, the electric loads 21 supported by the vehicle electrical system, the forecast of said Start & Stop system as well as other features and particulars of the vehicle. In addition, the processor which carries out the steps of comparison and sends actuation signals can be the vehicle ECU 23 itself, a control unit other than the ECU, or a processing unit specifically designed for this particular purpose.

Anyway, the preliminary tests carried out, show that there is a saving in vehicle fuel consumption and hence a reduction in carbon dioxide emissions (C02), polluting gas emissions such as carbon monoxide (CO), hydrocarbons (HC) and nitrogen oxides (NOX).

The invention claimed is:

1. An intelligent system for a selective electromechanical coupling and/or uncoupling of automotive alternator, of the type to be applied to a vehicle equipped with an internal combustion engine, said engine having a crankshaft, protruding beyond an engine block, and wherein a pulley for mechanical drive is coupled, in rotation, of an alternator and other automotive devices, said alternator comprising:
   a rotor and a stator, said rotor having a shaft protruding beyond a housing;
   an electromagnetic clutch coupled to the alternator rotor shaft and fixed in relation to the alternator housing, said clutch externally supporting a pulley which is coupled, in rotation, by a belt, in the crankshaft pulley;
   a voltage regulator which controls the alternator output voltage, said voltage regulator receiving command signals by a connector, through a data line coming from an ECU; and
   a voltage output, electrically coupled to vehicle electrical loads and to a battery, said battery being connected to a battery state-of-charge sensor, and wherein said sensor sends indicative signals of the battery state-of-charge to the ECU, via a data line,
   wherein the ECU commands the alternator coupling and/or uncoupling depending on the battery state-of-charge, the alternator coupling and/or uncoupling is ECU commanded for performing two successive and different actions, the first action being the mechanical coupling and/or uncoupling and the other action being the electrical coupling and/or uncoupling.

2. The system according to claim 1, wherein the ECU commands the alternator coupling and/or uncoupling depending on the comparison of the received signal from the sensor with LCi and LCs values of pre-defined loads, respectively.

3. The system according to claim 1, wherein the ECU commands the alternator coupling and/or uncoupling, through a data line, which connects an ECU output with a clutch powering and driving input, intermediated by a relay.

4. The system according to claim 3, wherein the clutch comprises a coil electrically connected with a powering and driving input, said coil being supported by a flange and acting to magnetically translate a disc, said disc being coupled to a shaft end, the opposite end of said shaft being shaped to couple an alternator shaft protruding end, and wherein the clutch shaft is mechanically coupled to the pulley by means of a support structure.

5. The system according to claim 1, wherein the clutch comprises a coil electrically connected with powering and driving input, said coil being supported by a flange and acting to magnetically translate a disc, said disc being coupled to a shaft end, the opposite end of said shaft being shaped to couple an alternator shaft protruding end, and wherein the clutch shaft is mechanically coupled to the pulley by means of a support structure.

6. The system according to claim 5, wherein the flange is held in position by pillars which protrude from a flange fixed to the alternator housing front portion, and wherein the pulley is disposed in the portion internally bounded by the flanges.

7. A method for a selective electromechanical coupling of an automotive alternator, comprising the steps of:
   detecting a battery state-of-charge;
   comparing the battery charge to a predetermined charge value (LCi, LCs); and
   performing an alternator coupling when the battery charge is lower than the LCi value;
   wherein the step of performing the coupling comprises the steps of:
   mechanically coupling the alternator; and
   electrically connecting the alternator.

8. The method according to claim 7, comprising providing a delay time between the mechanical coupling step and the electrical connection step.

9. A method for a selective electromechanical uncoupling of an automotive alternator, comprising the steps of:
   detecting a battery state-of-charge;
   comparing the battery charge to a predetermined charge value (LCi, LCs); and
   performing an alternator uncoupling when the battery charge is higher than the LCs value,
   wherein the uncoupling step comprises the steps of:
   electrically disconnecting the alternator; and
   mechanically uncoupling the alternator.

10. The method according to claim 9, comprising providing a delay time between the electric disconnection step and the mechanical uncoupling step.

* * * * *